United States Patent
Lee (10) Patent No.: US 7,554,085 B2
(45) Date of Patent: Jun. 30, 2009

(54) BOLOMETRIC INFRARED SENSOR HAVING TWO-LAYER STRUCTURE AND METHOD FOR MANUFACTURING THE SAME

(75) Inventor: Hong-Ki Lee, Seongnam-si (KR)

(73) Assignee: OCAS Corp. (KR)

( * ) Notice: Subject to any disclaimer, the term of this patent is extended or adjusted under 35 U.S.C. 154(b) by 124 days.

(21) Appl. No.: 10/574,935

(22) PCT Filed: Sep. 9, 2004

(86) PCT No.: PCT/KR2004/002294

§ 371 (c)(1),
(2), (4) Date: Mar. 15, 2007

(87) PCT Pub. No.: WO2005/034248

PCT Pub. Date: Apr. 14, 2005

(65) Prior Publication Data

US 2007/0262256 A1    Nov. 15, 2007

(30) Foreign Application Priority Data

Oct. 9, 2003    (KR) .................. 10-2003-0070410
Aug. 4, 2004    (KR) .................. 10-2004-0061285
Sep. 6, 2004    (KR) .................. 10-2004-0070714

(51) Int. Cl.
*G01J 5/20*    (2006.01)
(52) U.S. Cl. .................................. 250/338.4
(58) Field of Classification Search .............. 250/332, 250/338.1, 338.4
See application file for complete search history.

(56) References Cited

U.S. PATENT DOCUMENTS

| | | | |
|---|---|---|---|
| 5,300,915 A | 4/1994 | Higashi et al. | |
| 5,825,029 A | 10/1998 | Agnese et al. | |
| 6,198,099 B1 | 3/2001 | Kim | |
| 6,441,374 B1 | 8/2002 | Kawano et al. | |
| 6,448,557 B2 | 9/2002 | Oda | |

FOREIGN PATENT DOCUMENTS

| | | | |
|---|---|---|---|
| JP | 10-332480 | | 12/1998 |
| JP | 10332480 A | * | 12/1998 |
| JP | 2002-71452 | | 3/2002 |
| KR | 2000-0004158 | | 1/2000 |
| KR | 2000-0046515 | | 7/2000 |
| KR | 10-0299642 | | 9/2001 |
| KR | 10-0299643 | | 10/2001 |
| WO | WO 94/01743 A1 | | 1/1994 |

* cited by examiner

*Primary Examiner*—David P Porta
*Assistant Examiner*—Mark R Gaworecki
(74) *Attorney, Agent, or Firm*—Venable LLP; Henry J. Daley

(57) ABSTRACT

The present disclosure is related to bolometric infrared sensors having a two-layer structure and methods for manufacturing the same for improving an absorption rate by a spectroscopic design for resonantly absorbing infrared, and preventing the deformation of a sensor caused by stresses due to heat. The infrared sensor including an ROIC substrate and several pixels, comprises: a bottom layer including a reflective metal layer on the ROIC substrate; a cavity for resonantly absorbing infrared ray over the bottom layer; an upper layer of a sandwich shape including an absorption-transmission layer having a cutting area in the middle thereof and a bolometer layer placed both on and under the absorption-transmission layer; and anchors positioned at the edges of the pixel for supporting the upper layer and functioning as electrodes.

19 Claims, 10 Drawing Sheets

BOLOMETRIC INFRARED SENSOR HAVING TWO-LAYER STRUCTURE AND METHOD FOR MANUFACTURING THE SAME

TECHNICAL FIELD

The present disclosure relates to bolometric infrared sensors having a two-layer structure and methods for manufacturing the same and, more particularly, to bolometric infrared sensors and manufacturing methods thereof for:

improving an absorption rate by a spectroscopic design for resonantly absorbing infrared ray through a λ/4 optical path including cavity; and preventing the deformation of the sensor caused by various stresses due to heat by means of: 1) making a pixel symmetric against a diagonal line thereof; 2) forming a sandwich structure in an absorption-transmission layer having a cutting area; and 3) making a buffer layer including a silicon nitride layer.

BACKGROUND ART

There are two general categories of infrared sensors (hereinafter referred to as "IR sensor"), namely, a cooled type IR sensor and an un-cooled type IR sensor. The cooled type IR sensor detects electric signals generated by interactions between photons of infrared ray and electrons of an object. The un-cooled type IR sensor operates by detecting thermal variation created by the infrared absorbed in the object. The cooled type IR sensor mainly comprises semiconductor devices and provides low noises and a quick response time. There are, however, several shortcomings in the cooled type IR sensor. For example, liquid nitrogen temperature, −193° C., is required to activate the cooled type IR sensor. The un-cooled IR sensor has a relatively low performance, but can operate in a normal temperature. Thus, the cooled IR sensor requiring a cooling process is mainly used in a munitions industry. On the other hand, the un-cooled IR sensor is mainly produced for civilian purpose.

The un-cooled type IR sensor is again divided into a bolometer type, a thermocouple type, and a pyro-electric type. The pyro-electric type IR sensor has high detectivity but low productivity. In contrast to the pyro-electric type IR sensor, both the bolometer type and the thermocouple type IR sensors have a relatively lower detectivity than that of the pyro-electric type IR sensor, but high productivity can be achieved by manufacturing the IR sensors together with detection circuits on a single silicon wafer (monolithic type). Therefore, both the bolometer type and the thermocouple type IR sensors meet the civilian demands. The bolometer type IR sensor detects infrared ray by absorbing infrared ray radiated from an object, converting the absorbed infrared into thermal energy causing temperature increase, and measuring the resistance variation generated by such thermal variations.

Figure 1:
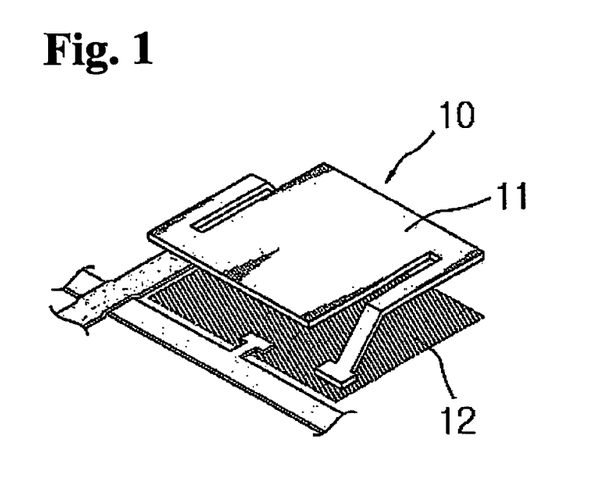
FIG. 1 illustrate a prospective view of a bolometric infrared sensor having a two-layer structure in accordance with the prior art method.

FIG. 1 illustrates a two-level bolometric IR sensor as disclosed in U.S. Pat. No. 5,300,915 referred to as "thermal sensor".

Referring to FIG. 1, the two-level bolometric IR sensor 10 comprises a raised upper layer 11 and a lower layer 12. The lower layer has a flat surface semiconductor substrate such as a silicon substrate. The surface of the silicon substrate has several components of an integrated circuit including diodes, x and y bus lines, connections, and contact pads at the end of the x bus lines. The raised upper layer 11 includes a first silicon nitride layer, a bolometer layer, a second silicon nitride layer therebetween, and an IR absorbing layer over the second nitride layer. The two layers 11 and 12 are separated by a cavity.

In the above-mentioned prior IR sensor, a number of problems exist. For example, a plural of supporting parts are placed on the raised upper layer, thereby decreasing an entire area for absorbing the infrared ray. Therefore, a maximum area for absorbing the infrared ray can be hardly achieved.

Korean Patent No. 10-299642, Korean Patent No. 10-299643, U.S. Pat. No. 6,441,374, and U.S. Pat. No. 6,448,557 disclose IR sensors and fabricating methods thereof for improving sensitivity and fill factor of an IR sensor, such as a bolometric sensor with three layers, a method for manufacturing a bolometric sensor with three layers, a bolometric sensor with three layers including a infrared reflective layer, and a thermal type infrared ray detector with a thermal separation structure, respectively.

However, in the above-mentioned prior art, electrical and structural properties of infrared sensors are used to improve an absorption rate. Thus, in comparison to IR sensors designed based on a spectroscopic approach, such prior IR sensors provide only a relatively low absorption rate. In addition, in the infrared ray absorbing bolometer according to the prior art methods, an upper part absorbing an infrared ray is raised from an bottom part (i.e., cavity is formed), thereby resulting in the deformation of the upper part of the IR sensor, detrimentally affecting the characteristics of the IR sensor.

To solve such problems, several solutions have been provided. For example, in Korean Publication No. 2000-46515, an IR sensor with three layers is disclosed which comprises a silicon oxy-nitride layer both on and under a silicon oxide layer again enclosing a bolometer layer to prevent the deformation of the IR sensor caused by reactions between vapors in the air and the silicon oxide layer. In Korean Publication No. 2000-04158, an bolometric IR sensor is disclosed which comprises a bolometric IR sensor is disclosed which comprises a driving layer, a supporting layer, a backing layer therebetween and an absorbing layer.

In spite of such solutions, there still exist a number of shortcomings. In detail, additional processes are required to form the silicon oxy-nitride layer and heat, instead of vapor, still cause the deformation of the upper part. In addition, the formation of the backing layer also requires additional processes and reduces an IR absorbing area.

DISCLOSURE OF INVENTION

Accordingly, the present invention is directed to a bolometric infrared sensor having a two layer structure and a method for manufacturing the same that obviates one or more problems due to limitations and disadvantages of the related art.

A primary object of the present invention is to provide a bolometric infrared sensor having a two-layer structure and a method for manufacturing the same capable of improving an absorption rate by a spectroscopic design for resonantly absorbing infrared ray, preventing the deformation of a sensor caused by stresses due to heat by forming a buffer layer and optimizing the structure of pixels.

To achieve these objects and other advantages and in accordance with the purpose of the invention, as embodied and broadly described herein, the present invention provides an infrared sensor including a Read Out IC (hereinafter referred to as "ROIC") substrate and several pixels, comprising: a first buffer layer on the ROIC substrate; a bottom layer including a reflective metal layer on the first buffer layer; a cavity for resonantly absorbing infrared ray over the bottom layer; an upper layer including a first insulating layer over the cavity, a second buffer layer on the first insulating layer, a bolometer layer on the second buffer layer, a second insulating layer on the bolometer layer and an absorption-transmission layer on the second insulating layer; and a unit pixel including more than a pair of anchors on the ROIC substrate for supporting the upper layer.

In addition, another object is achieved by an infrared sensor including an ROIC substrate and several pixels, comprising: a bottom layer including a reflective metal layer on the ROIC substrate; a cavity for resonantly absorbing infrared ray over the bottom layer; an upper layer having a symmetric structure against a diagonal line of the pixel, and the anchors and a bolometer layer placed both on and under the absorption-transmission layer; first anchors and second anchors which diagonally face to each other at the ends of the pixel, wherein the second anchors function as electrodes connected to read access terminals on the ROIC substrate and the distance between the second anchors is shorter than that between the first anchors.

Moreover, still another object is achieved by an infrared sensor including an ROIC substrate and several pixels, comprising: a bottom layer including a reflective metal layer on the ROIC substrate; a cavity for resonantly absorbing infrared ray over the bottom layer; an upper layer of a sandwich shape including an absorption-transmission layer having a cutting area in the middle thereof and a bolometer layer placed both on and under the absorption-transmission layer; and anchors positioned at the edges of the pixel for supporting the upper layer and functioning as electrodes.

Furthermore, still another object is achieved by a method of fabricating an infrared sensor comprising the steps of: forming a reflective metal layer on an ROIC substrate; depositing a sacrificial layer on the reflective metal layer by an SOP coating and removing the upper part of the sacrificial layer by plasma; positioning a bolometer layer and an absorption-transmission layer on the sacrificial layer, forming via holes within the sacrificial layer, the bolometer layer, and the absorption-transmission layer; filling a metallic material into the via holes to make anchors as electrodes; and forming a cavity by removing the sacrificial layer.

BRIEF DESCRIPTION OF THE DRAWINGS

Further objects and advantages of the invention can be more fully understood from the following detailed description taken in conjunction with the accompanying drawings, in which.

BEST MODE FOR CARRYING OUT THE INVENTION

Reference will now be made in detail to the preferred embodiments of the present invention, examples of which are illustrated in the accompanying drawings.

FIGS. 2 through 11 illustrate prospective, cross-sectional, and top views of unit pixels of a bolometric infrared sensor having a two-layer structure in accordance with embodiments of the present invention.

In accordance with the present invention, the IR sensor having a two-layer structure and unit pixel of 50 μm×50 μm comprises a bottom layer 100, an upper layer 200, a cavity therebetween 300, and anchors 401, 402, 403, 404a, 404b, 404c, 404d and 405 for supporting the upper layer 200.

The bottom layer 100 includes ROIC substrates 101, 111, 121, 131, 141 and 151 (hereinafter collectively referred to as "1X1") and reflective metal layers 102, 112, 122, 132, 142 and 152 (hereinafter collectively referred to as "1X2") thereon. The reflective metal layers 1X2 are made of a material selected from the group consisting of Ti, Al and Al alloy. The thickness of the reflective metal layer is preferably between 2000 Å and 5000 Å for Ti, and between 500 Å and 10000 Å for Al or Al alloy. A first buffer layer 113, 123 comprising a silicon nitride ($SiN_x$) layer may be either between the ROIC substrates 1X1 and the reflective metal layers 1X2 or under the ROIC substrate. The first buffer layer is capable of minimizing the stress caused by heat from the IR sensor.

More than a pair of anchors are placed at the ends of each pixel. Each of the anchors may be able to function as electrodes. The cavity 300 between the bottom layer 100 and the upper layer 200 has a height ranging between 1 μm and 3 μm, and is kept with vacuous.

Bolometer layers 202, 212, 222, 232, and 242 (hereinafter collectively referred to as "2X2") and absorption-transmission layers 204, 214, 224, 234, and 244 (hereinafter collectively referred to as "2X4") are positioned on the cavity 300. The bolometer layers 2X2 are made of a material selected from the group consisting of Ti, $TiO_x$, $VO_x$, and doped amorphous silicon. The bolometer layers 2X2 either may be positioned on the upper layer 200 or have specific patterns. For example, the bolometer layers 2X2 made of Ti may have a predetermined thickness ranging between 300 Å and 1500 Å, and a predetermined area ratio (i.e., the bolometer layer to upper layer) to make a fill-factor (i.e., an effective area absorbing infrared ray) more than 50%. The bolometer layers 2X2 made of $TiO_x$ may have a thickness between 500 Å and 5000 Å. The bolometer layers 2X2 made of doped amorphous silicon may have a thickness between 500 Å and 3000 Å, and be designed to make the area ratio more than 80%.

The absorption-transmission layers 2X4 are positioned on the top surface of the upper layer 200 in order to improve the absorption rate. Here, the absorption-transmission layers 2X4 re-absorb infrared ray by the destructive interference between the infrared ray reflected from the reflective metal layer 1X2 and the infrared ray transmitting the absorption-transmission layer 2X4. For the re-absorption, the absorption-transmission layers 2X4 are placed from the reflective metal layers 1X2 at a distance of $\lambda/4/(\lambda$: the central wavelength of infrared to be detected) in order to make the infrared ray absorbed within the cavity 300.

The absorption-transmission layers 2X4 preferably comprise a material selected from the group consisting of Ti, TiN and Cr. The thickness of the absorption-transmission layers 2X4 is preferably about between 20 Å and 100 Å for Ti or TiN, and between 20 Å and 200 Å for Cr. In addition, a first insulating layer may be positioned under the bolometer layers 2X2. A second insulating layer and a second buffer layer may be placed between the bolometer layers 2X2 and the absorption-transmission layers 2X4. Here, the first and second insulating layers are preferably made of silicon oxide ($SiO_2$). The second buffer layer is preferably made of a material comprising silicon nitride. The upper layer 200 may include an insulation cut for thermal insulation and an etching hole for reducing stresses and forming the cavity 300. Each of the thermal time constant of layers constituting a unit pixel of the IR sensor is within 33 msec, preferably between 2 msec and 5 msec. Here, the thermal time constant is the time taken for the IR sensor to cool to 37% of the difference between an initial temperature and an increased temperature of the IR sensor. The thermal time constant is calculated based on the equation expressed as "thermal time constant=heat capacity/thermal conductivity". If a time difference between two consecutive pictures is longer than 33 msec, the thermal time constant should be less than 33 msec to prevent afterimages in human eyes.

Hereafter, preferred embodiments of the present invention will be described in detail with reference to accompanying drawings.

Figure 2:
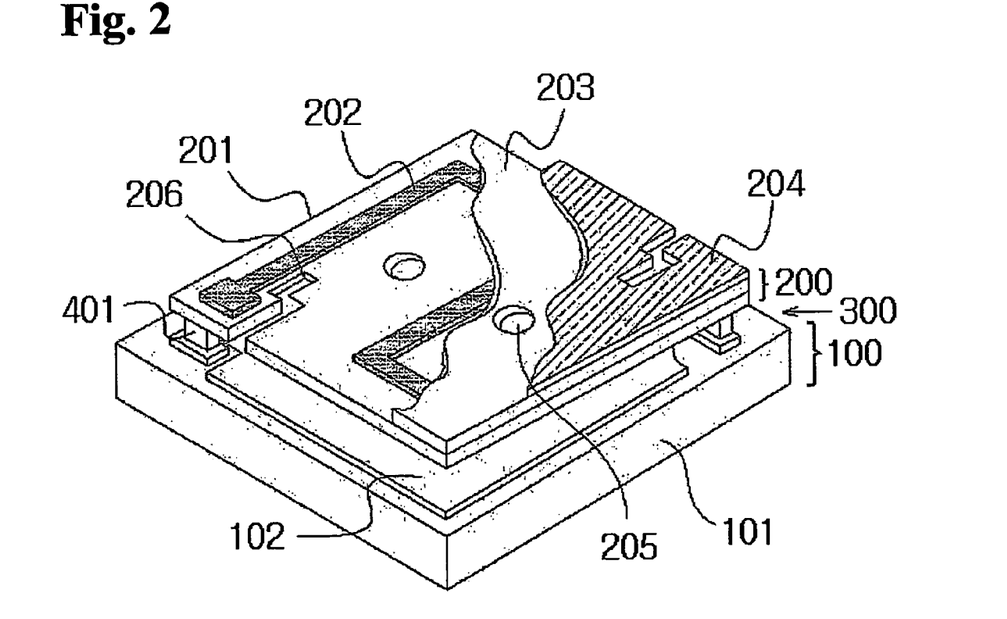
FIG. 2 illustrates a prospective view of a bolometric infrared sensor having a two-layer structure in accordance with an embodiment of the present invention.
Figure 3:
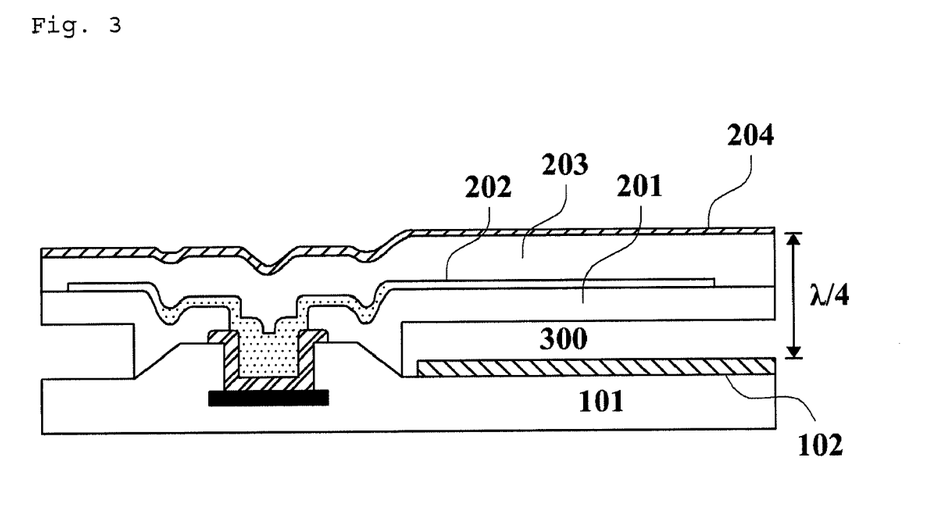
FIG. 3 illustrates a cross-sectional view of the bolometric infrared sensor having a two layer structure in accordance with the embodiment of FIG. 2.

Referring to FIGS. 2 and 3, a bolometric IR sensor having a two-layer structure comprises a bottom layer 100, an upper layer 200, and a cavity 300 therebetween.

The upper layer 200 includes a first insulating layer 201 for electronic insulation, a bolometer layer 202 thereon with a predetermined shape, a second insulating layer 203 on both the first insulating layer 201 and the bolometer layer 202, and an absorption-transmission layer 204 on the second insulating layer 203. Etching holes, which reduce an etching time, and relieve the physical stress of a unit pixel, are positioned on the upper layer 200 with a diameter less than 5 µm. In addition, insulation cuts for thermal insulation are positioned on the upper layer 200 with a width less than 5 µm. The first and second insulating layers have a thickness ranging between 300 Å and 1500 Å and are made of silicon oxide ($SiO_2$). Furthermore, the upper layer 200 may include etching holes 205 for removing a sacrificial layer (not shown) and insulation cuts 206 for thermal insulation.

The bolometer layer is shaped with a "ㄹ" pattern and its width is between 3 µm and 9 µm. The rectangular area joining the bolometer layer 202 to anchor 401 is between 5 µm×5 µm and 10 µm×10 µm. The absorption-transmission layer 204 is made of Ti with a thickness ranging between 40 Å and 70 Å.

Figure 4:
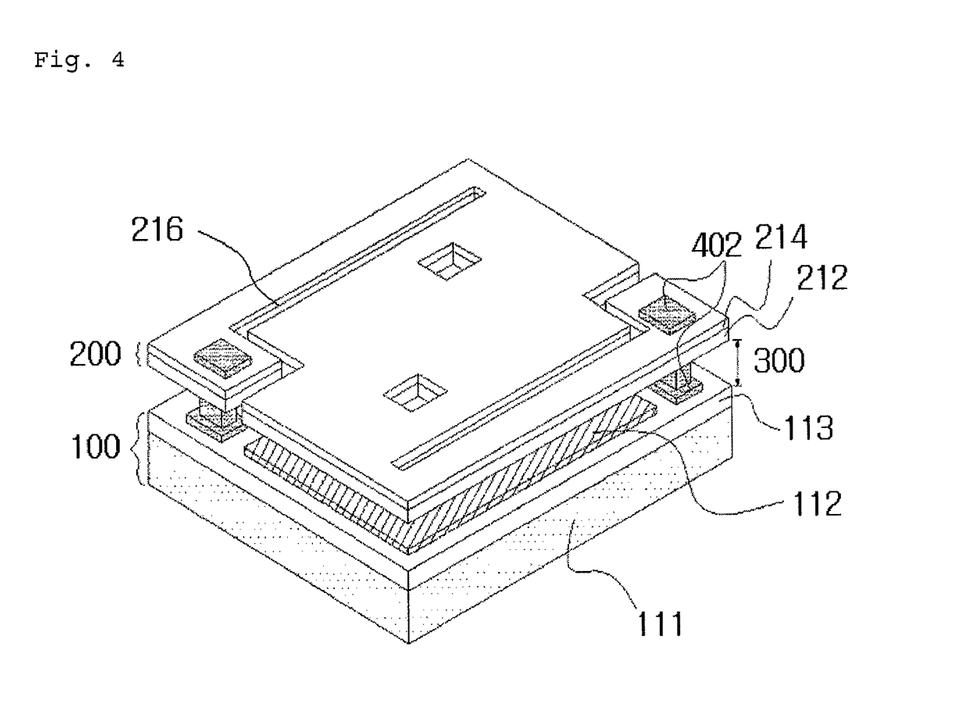
FIG. 4 illustrates a prospective view of a bolometric infrared sensor having a two-layer structure in accordance with another embodiment of the present invention.
Figure 5:
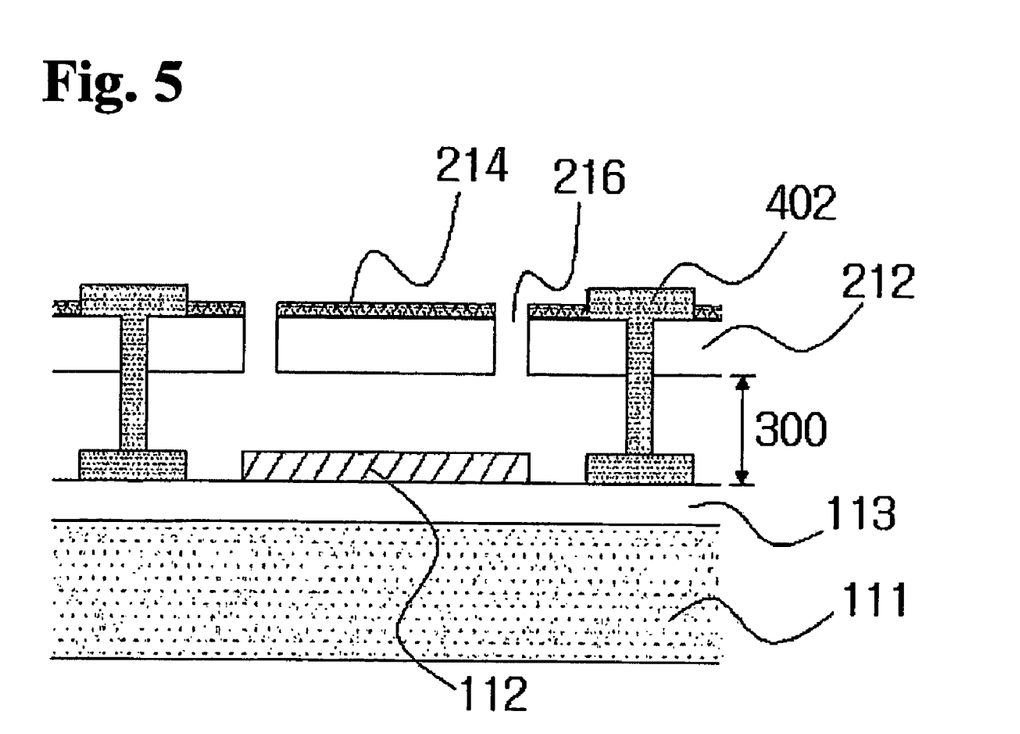
FIG. 5 illustrates a cross-sectional view of the bolometric infrared sensor having a two-layer structure in accordance with the embodiment of FIG. 4.

Next, referring to FIGS. 4 and 5, an upper layer 200 of another bolometric IR sensor having a two-layer structure comprises a bolometer layer 212, an absorption-transmission layer 214, anchors functioning as electrodes 402 and connecting the bottom layer 100 with the upper layer 200, and insulation cuts 216 for thermal insulation. Both the bolometer layer 212 and the absorption-transmission layer 214 are positioned on the entire part of the upper layer 200. The bolometer layer is preferably made of doped amorphous silicon.

Figure 6:
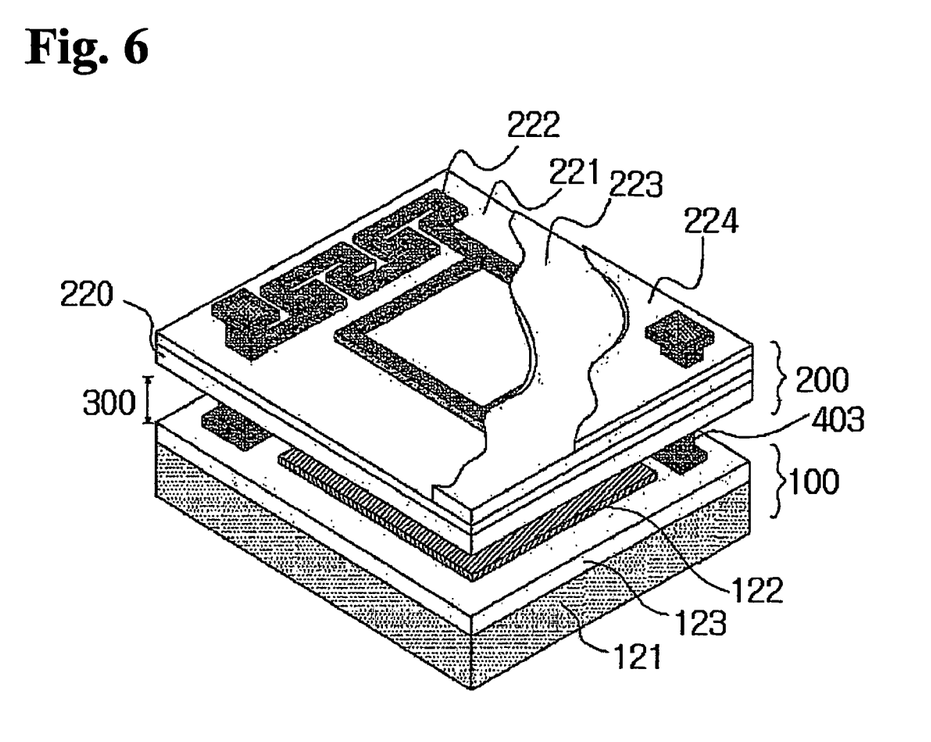
FIG. 6 illustrates a prospective view of a bolometric infrared sensor having a two-layer structure in accordance with still another embodiment of a present invention.
Figure 7:
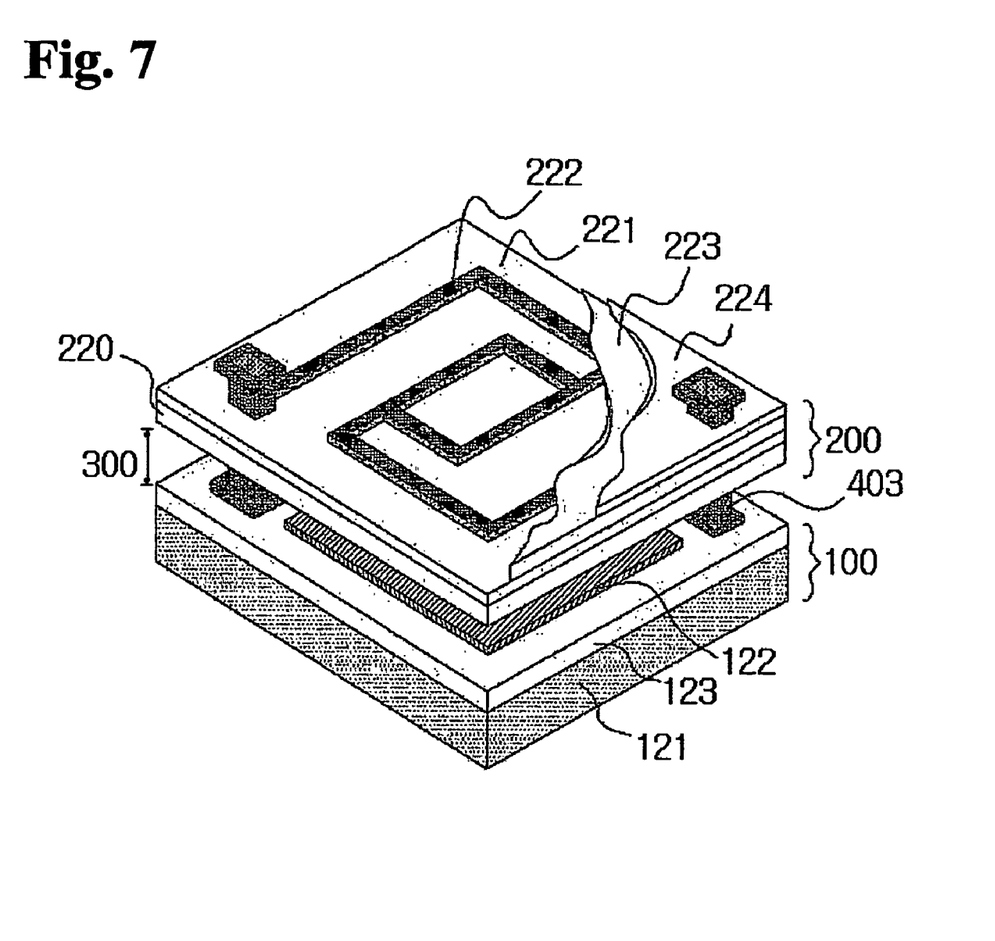
FIG. 7 illustrates a prospective view of the bolometric infrared sensor having a two-layer structure in accordance with the embodiment of FIG. 6.

Next, referring FIGS. 6 and 7, an upper layer 200 of still another bolometric IR sensor having a two-layer structure comprises a first insulating layer 220, a second buffer layer 221 thereon, and a bolometer layer 222. Here, the first insulating layer is preferably silicon oxide ($SiO_2$) with a thickness ranging between 0.65±0.1 µm. The second buffer layer 221 is preferably made of a material comprising silicon nitride ($SiN_x$) with a thickness between 0.2±0.05 µm. The bolometer layer 222 on the top of the second buffer layer is preferably made of a material comprising Ti or $TiO_x$(x=1 to 3). The bolometer layer has a thickness ranging between 300 Å and 1500 Å for Ti, and between 500 Å and 5000 Å for $TiO_x$. In order to relieve stress, the first insulating layer and the second buffer layer may be alternately and repeatedly formed under the bolometer layer 222. Subsequently, a second insulating layer made of silicon oxide 223 is formed on the bolometer layer 222, and an absorption-transmission layer 224 is placed thereon. Insulation cuts (not shown) are formed on the upper layer 200.

Figure 8:
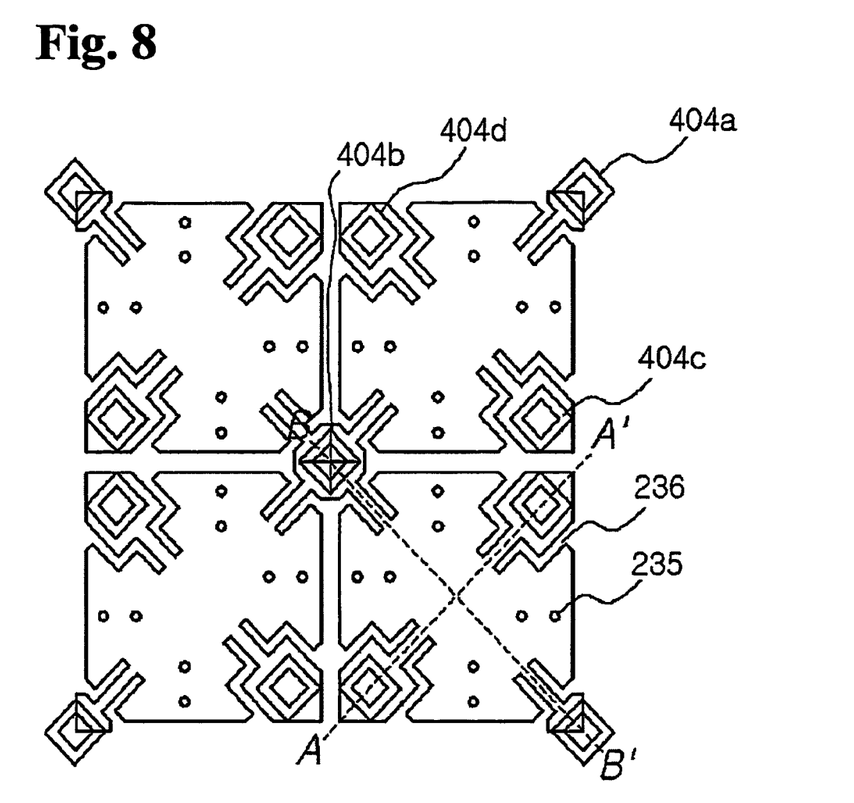
FIG. 8 illustrates a top view of pixels of a bolometric infrared sensor having a two-layer structure in accordance with still another embodiment of the present invention.
Figure 9:
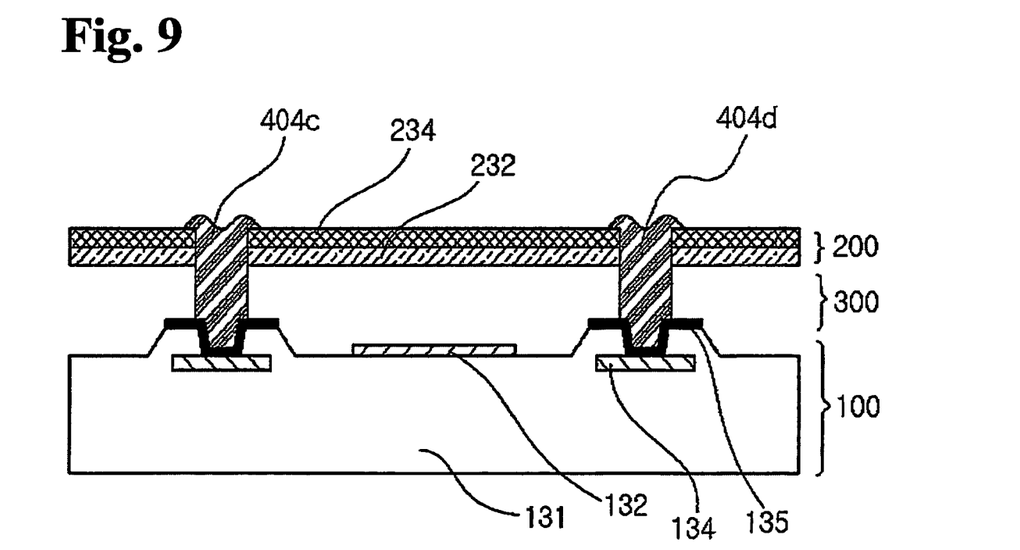
FIG. 9 illustrates a cross-sectional view along the line A-A' as shown in FIG. 8.

Next, referring to FIGS. 8 and 9 (a cross-sectional view along the line A-A' as shown in FIG. 8), an upper layer 200 of still another bolometric IR sensor having a two-layer structure is symmetric against the diagonal line of a pixel, resembling a butterfly shape. The butterfly shape is capable of minimizing the deformation of the IR sensor from shear stress. In addition, the IR sensor can reduce resistance by making the distance between first anchors 404a and 404b longer than the distance between second anchors 404c and 404d, therefore effectively and efficiently detecting infrared ray. Furthermore, the upper layer 200 includes etching holes 235 for removing a sacrificial layer (not shown) and insulation cuts for thermal insulation. The second anchors 404c and 404d not only support the upper layer 200, but also simultaneously function as electrodes connected to read access terminals on an ROIC substrate. A cross sectional view along the line B-B' in FIG. 8 (not shown) is identical to the FIG. 9 except that the first anchors 404a and 404b are not connected to the read access terminals. In addition, the upper layer 200 may further have insulating layers or buffer layers on and/or under the bolometer layer 232. The bolometer layer 232 is made of N type or P type doped amorphous silicon and preferably has a thickness ranging between 500 Å and 3000 Å.

Figure 10:
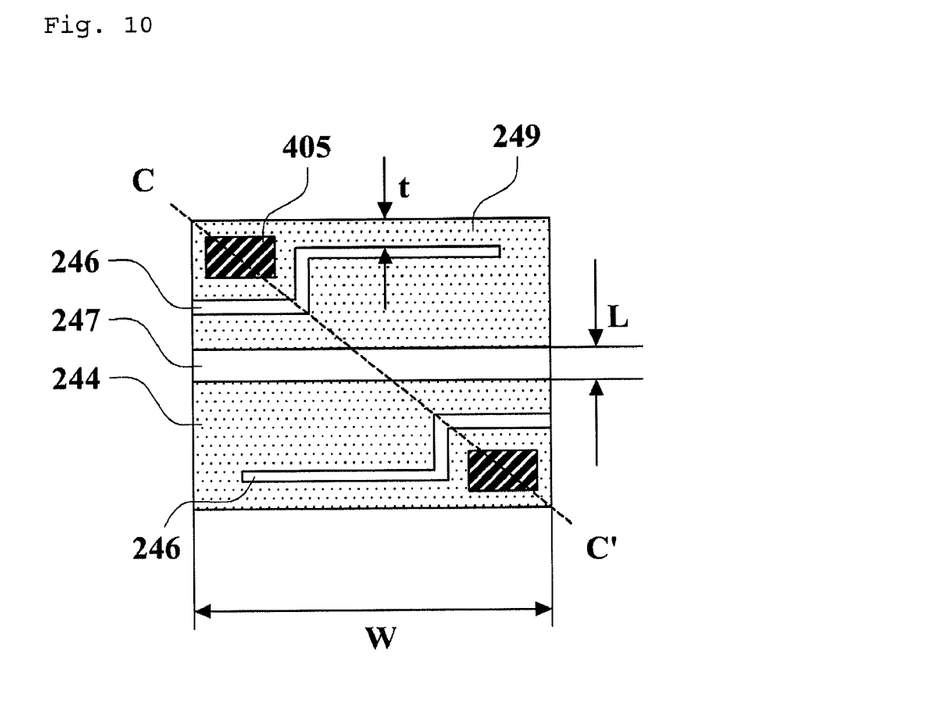
FIG. 10 illustrates a prospective view of the bolometric infrared sensor having a two-layer structure in accordance with still another embodiment of the present invention.
Figure 11:
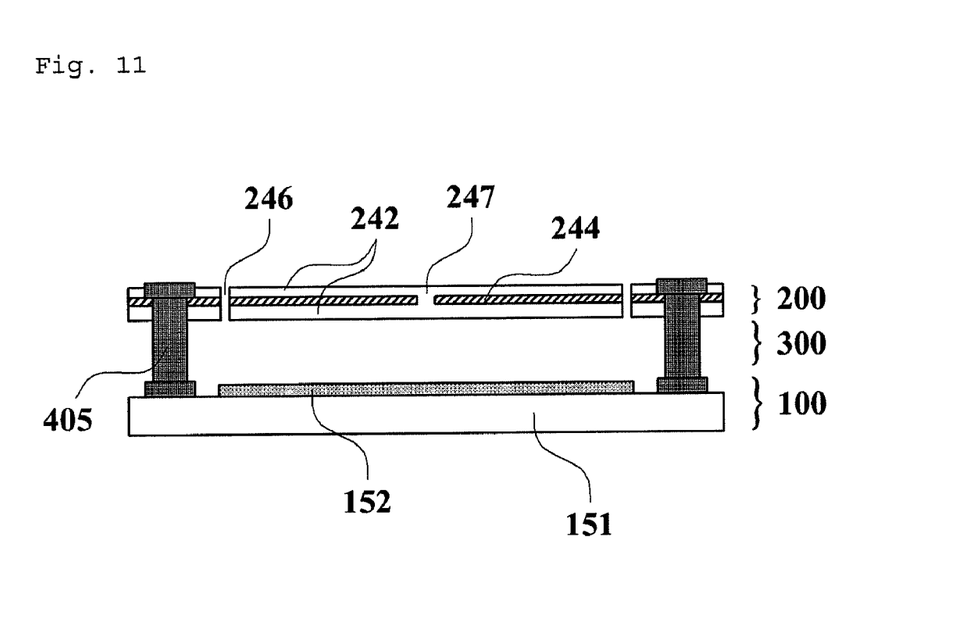
FIG. 11 illustrates a cross-sectional view along the line C-C' as shown in FIG. 10.

Finally, referring to FIGS. 10 and 11 (a cross-sectional view along the line C-C' as shown in FIG. 10), an upper layer 200 of still another bolometric IR sensor having a two-layer structure comprises an absorption-transmission layer 244 and bolometer layers 242 both thereon and thereunder. A cutting area 247 is formed in the middle of the absorption-transmission layer 244. Insulation cuts 246 for thermal insulation are placed on the circumference of the anchors 405. In a prior art method for fabricating an IR sensor, the absorption-transmission layer may be expanded by heat during a thermal treatment. In addition, thermal stress generated by operations may be applied to the upper layer 200 including the absorption-transmission layer. Such problems may cause the deformation of the upper layer 200 or detrimentally affect the reliability of the IR sensor. However, in the IR sensors according to the present invention, such problems are solved by adopting a sandwich shape structure where bolometer layers 242 are placed on and under the absorption-transmission layer 242.

For instance, if compressive stress and/or tensile stress are/is applied to one of either the bolometer layers 242 or the absorption-transmission layer 244, the sandwich shape structure can offset the stresses, preventing the deformation of the upper layer 200. Moreover, heat from plasma, a hot plate, and a chamber generated during a process for forming the cavity 300 may increase the temperature of the ROIC substrate 141 and may expand the absorption-transmission layer 244, thereby creating the stress. The upper layer 200 can be relieved from the stress by the sandwich shape structure and the cutting area 247.

The sandwich shape structure is also able to reduce heat loss. In particular, destructive interferences occurring in the absorption-transmission layer 244 lead to absorb infrared ray. The heat is then transferred through the bolometer layers 242. Hence, the sandwich shape structure can prevent the heat loss occurring via the absorption-transmission layer 244. Furthermore, the cutting area 247 in the middle of the absorption-transmission layer 244 replaces the function of the etching holes for relieving the stress in prior arts, increasing an effective fill factor and reducing resistance.

The resistance of the bolometer layer 242 is determined by the cutting area 247 excluding the absorption-transmission layer 244. Thus, the resistance of the bolometer layer 242 (hereinafter referred to as "R") is calculated as $R_S \times (L/W)$ ("L" is the width of the cutting area 247, "W" is the length of the pixel, and "$R_S$" is sheet resistance). As $R_S$ of amorphous silicon with a thickness of 2000 Å is 10 ohm/□, if L is 2 μm and W is 50 μm, R will be 400 kohm, which is smaller than the resistance by method of prior art (i.e., about 500 kohm). Thus, a thin layer of desired resistance may be formed by adjusting the value of L/W.

As bridges 249 formed by the insulation cuts 246 are getting narrower and longer, thermal short effect may increase. However, the width (t) and length of the bridges 249 should be determined also in consideration of a safe support of the upper layer 200 having a cantilever shape. For example, if the "W" is 50 μm, the bridges 249 preferably have a width (t) ranging between 1.5 μm and 5 μm, and a length ranging between 4 μm and 35 μm.

In addition, the bolometric IR sensor having a two-layer structure shown in FIGS. 10 and 11 may have a symmetric structure (i.e., butterfly shape) as depicted in FIG. 8. In detail, the bolometric IR sensor can include the upper layer having the sandwich shape structure with a cutting area along with a diagonal line of the pixel and having the symmetric structure against the diagonal line of the pixel. Here, anchors comprise first anchors and second anchors. The first anchors and the second anchors diagonally face to each other at the ends of the pixel. The second anchors function as electrodes connected to read access terminals on an ROIC substrate. The distance between the second anchors is shorter than that between the first anchors.

Hereafter, steps of a process for fabricating a bolometric IR sensor having a two-layer structure will be described in detail with reference to FIGS. 12 through 15 (cross-sectional views along the line A-A' shown in FIG. 8).

Figure 12:
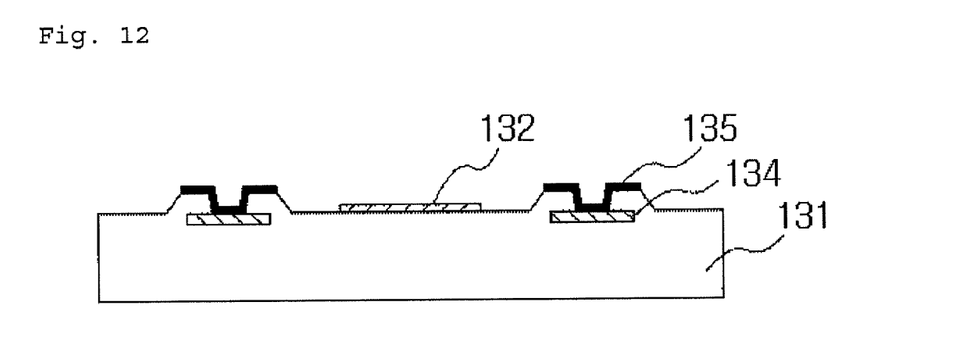
FIGS. 12 through 15 illustrate cross-sectional views of a manufacturing process of a bolometric infrared sensor having a two-layer structure along the line A-A' as shown in FIG. 8.

Referring to FIG. 12, an ROIC substrate 131 including read access terminals thereon is prepared. Subsequently, connecting terminal 134, electrode pads 135 and reflective metal layer 132 are deposited by vacuum deposition or sputtering processes, and patterned. A first buffer layer may be formed for insulating and separating pixels before the electrode pads 135 and the reflective metal layer 132 are patterned. Here, the first buffer layer is made of a material comprising silicon nitride.

Figure 13:
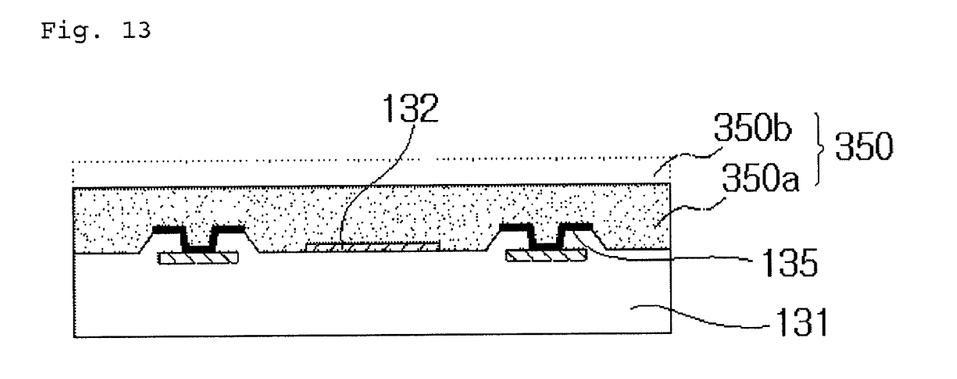

Next, referring to FIG. 13, a sacrificial layer 350 is formed on the resulting structure and the top thereof 350b is removed by a plasma etching. The sacrificial layer 350 has a thickness ranging between 0.5 μm and 3.5 μm by coating an organic thin layer(e.g., ACCUFLO 1513 EL of Honeywell) through an SOP (Spin On Polymer) process. In methods of prior art, the SOP process leaves traces of a spin coating on the surface of the sacrificial layer 350. Even after later processes for forming a bolometer layer (not shown) and removing the sacrificial layer are completed, the traces will remain on the bottom surface of the bolometer layer, leading to deform the bolometer layer. To solve such a problem, Ar/$O_2$ plasma is used to remove the top of the sacrificial layer 350b by a thickness between 100 Å and 2000 Å to relieve stresses.

Figure 14:
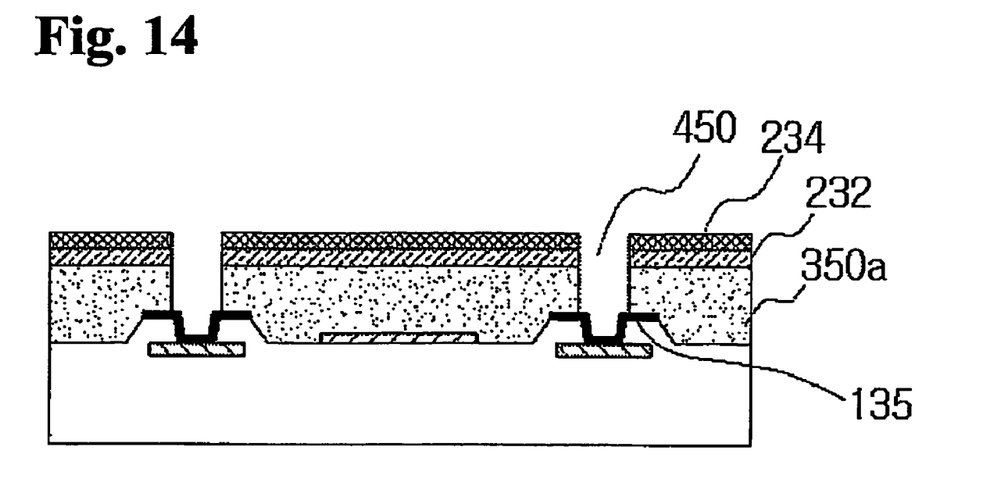

Subsequently, referring to FIG. 14, a bolometer layer 232 is formed on the sacrificial layer 350a, and an absorption-transmission layer 234 is deposited on the bolometer layer. Via holes 450 penetrating to the electrode pads 135 and insulation cuts (236 in FIG. 8) are then formed within the sacrificial layer, the bolometer layer and the absorption transmission layer of the resulting structure. The bolometer layer 232 is preferably made of either an N type or a P type amorphous silicon with a thickness ranging between 500 Å and 3000 Å.

The via holes and insulation cuts are preferably formed by a plasma etching with a gas selected from the group consisting of $CF_4$, $CHF_3$ and Ar. Additional insulating layers(not shown) may be directly formed on and/or under the bolometer layer 232. For example, a first insulating layer made of silicon oxide can be formed under the bolometer layer 232. And a second insulating layer made of silicon nitride can be formed between the bolometer layer 232 and the absorption-transmission layer 234 through a plasma enhanced chemical vapor deposition (PECVD) process.

Figure 15:
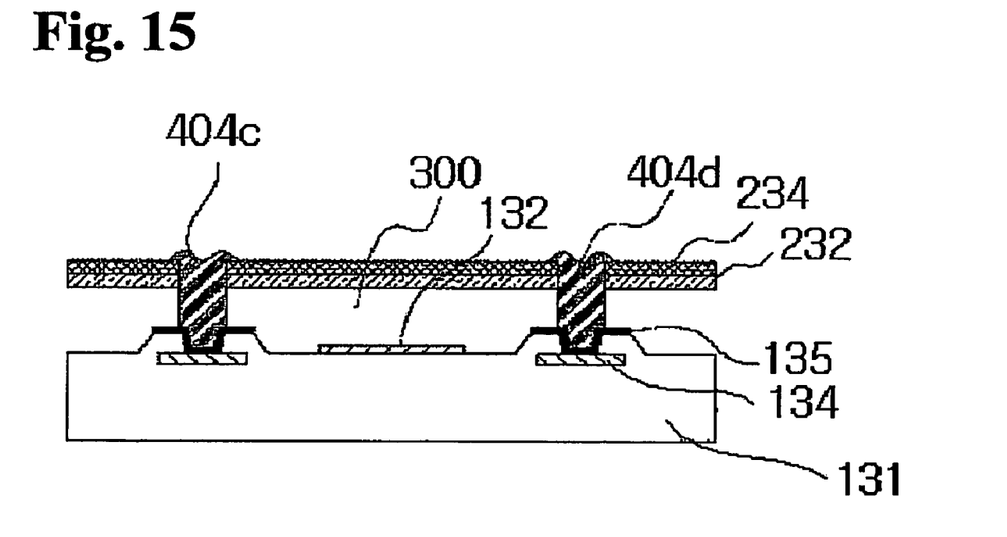

Subsequently, referring to FIG. 15, a metallic material for contacts is filled into the via holes and patterned to form anchors 404c and 404d also functioning as electrodes. The sacrificial layer 350a is then removed to form a cavity 300 by an $O_2$ plasma etching.

Figure 16:
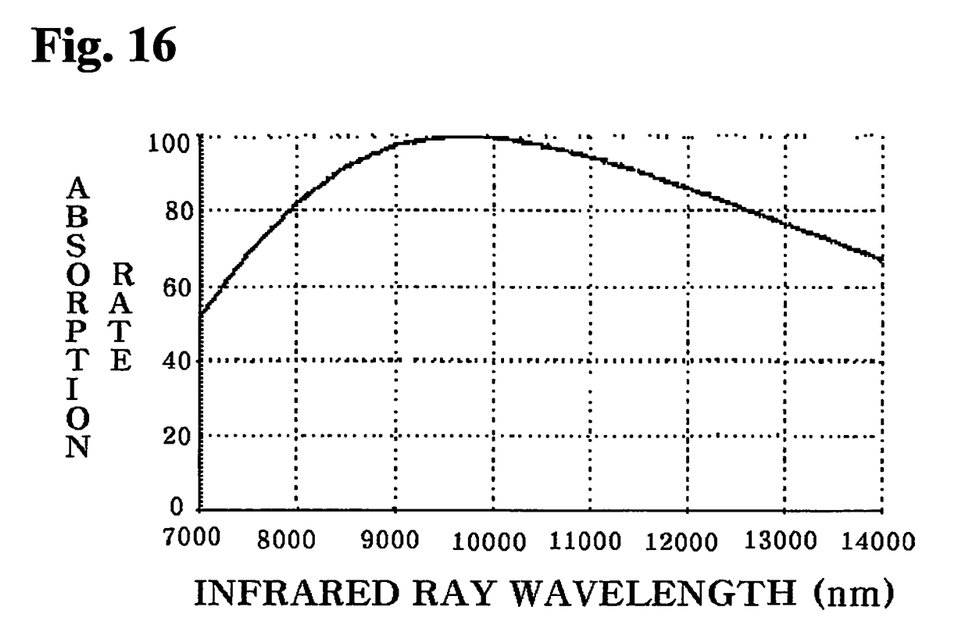
FIG. 16 is a graph representing the absorption rate of a bolometric infrared sensor having a two-layer structure in accordance with the present invention.

FIG. 16 illustrates the simulation result of an absorption rate of the bolometric IR sensor having a two-layer structure in accordance with the present invention. The absorption rate is more than 95% at a central wavelength of infrared ray from 7 μm to 14 μm.

Above described herein, the present invention provides one embodiment of a method for fabricating a bolometric IR sensor having a two-layer structure comprising the steps of: forming contact pads and a reflective metal layer on an ROIC substrate; forming a sacrificial layer by an SOP coating process; removing the upper part of the sacrificial layer by a plasma etching; forming a bolometer layer and an absorption-transmission layer; exposing predetermined parts for anchors by etching the sacrificial layer; and forming electrodes by using exposed parts for anchors; and forming a cavity by removing the sacrificial layer.

Here, the step of forming the absorption-transmission layer can be performed at the end of a fabricating process. For example, the present invention provides another embodiment of a method for fabricating a bolometric IR sensor having a two-layer structure comprising the steps of: forming contact pads and a reflective metal layer on an ROIC substrate; forming a sacrificial layer by an SOP coating process; removing the upper part of the sacrificial layer by a plasma etching; forming a bolometer layer on the sacrificial layer; exposing predetermined parts for anchors by etching the sacrificial layer; forming electrodes by using exposed parts for anchors; and forming a cavity by removing the sacrificial layer; and forming an absorption-transmission layer.

The methods for fabricating the IR sensor having a two-layer structure according to the present invention are embodied and broadly described with FIG. 8 and FIG. 9. However, the methods for fabricating IR sensor may be also applied to the other embodiments exemplified in FIGS. 2 through 11 without difficulties. Therefore, the detailed descriptions of the fabrication method for the other embodiments are omitted.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

INDUSTRIAL APPLICABILITY

Accordingly, the bolometric infrared sensors having a two-layer structure and the methods of manufacturing the same consistent with embodiments of the present invention are capable of improving the infrared absorption rate and simplifying the manufacturing process with a spectroscopic approach. Moreover, the bolometric infrared sensors in accordance with the present invention can be applicable to non-contact heat-emission diagnostors for various objects such as a fire hat, helmets for working in a manhole and tunnel, night visions in a car, surveillance cameras, printed circuit board and wafers. Furthermore, the bolometric infrared sensors in accordance with the present invention can be also applicable to military device such as human temperature vision diagnostors, night vision scopes for personal weapons, night vision system for watching sea shores and guard posts.

What is claimed is:

1. An infrared sensor including an ROIC substrate and several pixels, comprising:
   a first buffer layer on the ROIC substrate;
   a bottom layer including a reflective metal layer on the first buffer layer;
   a cavity for resonantly absorbing infrared ray over the bottom layer;
   an upper layer including a first insulating layer over the cavity, a second buffer layer on the first insulating layer, a bolometer layer on the second buffer layer, a second insulating layer on the bolometer layer and an absorption-transmission layer on the second insulating layer; and
   more than two anchors on the ROIC substrate for supporting the upper layer of the pixel.

2. The infrared sensor as defined by claim 1, wherein the first and the second buffer layers are made of a material comprising silicon nitride.

3. The infrared sensor as defined by claim 1, wherein the first and second insulating layers are made of silicon oxide.

4. An infrared sensor including an ROIC substrate and several pixels, comprising:
   a bottom layer including a reflective metal layer on the ROIC substrate;
   a cavity for resonantly absorbing infrared ray over the bottom layer;
   an upper layer of a sandwich shape including an absorption-transmission layer having a cutting area in the middle thereof and a bolometer layer placed both on and under the absorption-transmission layer; and
   anchors positioned at the edges of the pixel for supporting the upper layer and functioning as electrodes.

5. The infrared sensor as defined by claim 4, further comprising a first buffer layer under the reflective metal layer.

6. The infrared sensors as defined by claim 1 or claim 4, wherein the upper layer has a symmetric structure against a diagonal line of the pixel, and the anchors comprise first anchors and second anchors which diagonally face to each other at the ends of the pixel, wherein the second anchors function as electrodes connected to read access terminals on the ROIC substrate and the distance between the second anchors is shorter than that between the first anchors.

7. The infrared sensors as defined by claim 1 or claim 4, wherein the distance between the reflective metal layer and the absorption-transmission layer is $\lambda/4$, where $\lambda$ is the central wavelength of infrared to be detected.

8. The infrared sensors as defined by claim 1 or claim 4, wherein the reflective metal layer comprises a material selected from the group consisting of Ti and Al.

9. The infrared sensors as defined by claim 1 or claim 4, wherein the bolometer layer is made of a material selected from the group consisting of Ti, $TiO_x$, $VO_x$, and doped amorphous silicon.

10. The infrared sensors as defined by claim 1 or claim 4, wherein the absorption-transmission layer is made of a material selected from the group consisting of Ti, TiN and Cr.

11. The infrared sensor as defined by claim 10, wherein the absorption-transmission layer has a thickness ranging between 20 Å and 100 Å for Ti or TiN, and between 20 Å and 200 Å for Cr.

12. A method of fabricating an infrared sensor comprising the steps of:
   forming a reflective metal layer on an ROIC substrate;
   depositing a sacrificial layer on the reflective metal layer by an SOP coating and removing the upper part of the sacrificial layer by plasma;
   positioning a bolometer layer and an absorption-transmission layer on the sacrificial layer;
   forming via holes within the sacrificial layer, the bolometer layer, and the absorption-transmission layer;
   filling a metallic material into the via holes to make anchors as electrodes; and
   forming a cavity by removing the sacrificial layer.

13. The method defined by claim 12, wherein the sacrificial layer is removed by an $O_2$ plasma ashing process.

14. The method defined by claim 12, wherein the upper part of the sacrificial layer is removed by plasma using an $Ar/O_2$ gas.

15. The method defined by claim 14, wherein the thickness of the sacrificial layer removed is between 100 Å and 2000 Å.

16. The method defined by claim 12, wherein the bolometer layer is made of a material selected from the group consisting of Ti, $TiO_x$, $VO_x$, and doped amorphous silicon.

17. The method defined by claim 12, wherein the absorption-transmission layer is made of a material selected from the group consisting of Ti, TiN and Cr.

18. The method defined by claim 17, wherein the absorption-transmission layer has a thickness ranging between 20 Å and 100 Å for Ti or TiN, and between 20 Å and 200 Å for Cr.

19. The method defined by claim 12, wherein the formation of the via holes is performed by a plasma etching using a gas selected from the group consisting of $CF_4$, $CHF_3$ and Ar.

* * * * *